United States Patent [19]

Schweickardt

[11] 4,414,600
[45] Nov. 8, 1983

[54] PROTECTION DEVICE FOR HIGH INTENSITY GASEOUS DISCHARGE LAMP STARTING CIRCUIT

[75] Inventor: Karl Schweickardt, Cazenovia, N.Y.

[73] Assignee: Esquire, Inc., New York, N.Y.

[21] Appl. No.: 332,469

[22] Filed: Dec. 21, 1981

[51] Int. Cl.³ .............................................. H02H 9/04
[52] U.S. Cl. ................................. 361/56; 315/DIG. 7
[58] Field of Search ................... 361/56; 315/DIG. 7, 315/DIG. 5; 338/22 R, 22 SD, 23, 25

[56] References Cited

U.S. PATENT DOCUMENTS

| | | | |
|---|---|---|---|
| 3,568,125 | 3/1971 | Villemant et al. | 338/22 R |
| 4,087,723 | 5/1978 | Chermin et al. | 315/DIG. 7 X |
| 4,208,449 | 6/1980 | Knippenberg et al. | 338/22 R X |
| 4,326,149 | 4/1982 | Wyner et al. | 315/DIG. 7 X |

Primary Examiner—Reinhard J. Eisenzopf
Attorney, Agent, or Firm—Vaden, Eickenroht, Thompson, Bednar & Jamison

[57] ABSTRACT

A thickfilm manufactured resistive element that functions as a normal resistor in an HID lamp starting circuit where high voltage starting pulses are produced, but which exhibits a negative and extremely non-linear voltage coefficient of resistance characteristic when potentially destructive high voltage spikes occur as a result of circuit interruption during operation of the lamp. The resistive element is comprised of a mixture of refractory conductive, semiconductive, and nonconductive materials of an amorphous noncrystalline nature having the physical structure of a supercooled liquid, commonly referred to as glass, which has been discovered to exhibit the property of having an extremely non-linear voltage coefficient of resistance.

3 Claims, 2 Drawing Figures

PROTECTION DEVICE FOR HIGH INTENSITY GASEOUS DISCHARGE LAMP STARTING CIRCUIT

BACKGROUND OF THE INVENTION

1. Field of the Invention

This invention pertains to protection devices for a starting circuit of a high intensity gaseous discharge lamp, especially of the type of starter employed with a high pressure sodium lamp.

2. Description of the Prior Art

Starter circuits for high intensity, gaseous discharge lamps of the high pressure sodium type produce extremely high voltage pulses to initiate the lighting of these lamps. That is, the starter circuits are purposely designed to produce such pulses to an unlit lamp when power is applied to the circuit. Such lamps however, are not foolproof in design. When they are operating in the lighted condition, occasionally an open connection occurs either at the terminals of the lamp or in the connections to the lamp. When this happens, because of the inherent design of the starter circuit, there is almost certain to be such a high voltage applied back into the starter circuit components so as to cause failure of one or more of these components. That is, there will exist a momentary high voltage of such high value that a capacitor, a resistor, a triac, a transformer or more than one of such components will fail. Although it is possible to include fuses or circuit breakers, such conventional devices do not respond quickly enough to accomplish the protection required.

Therefore, it is a feature of the present invention to provide an improved starting and protection means for a high intensity, gaseous discharge lamp of the type that requires high voltage pulses to be applied to the lamp when it is in its unlit condition.

It is another feature of the present invention to provide a protection element for a circuit receiving extremely high voltage pulses which has a negative coefficient of resistance only at extremely high voltages and therefore functions as a normal resistor except in the presence of such high voltage.

It is still another feature of the present invention to provide a protection element for high voltages that operates even in the presence of extremely short pulses.

SUMMARY OF THE INVENTION

A protection element is employed in the pulse starting network of a lamp system comprised of one or more high intensity gaseous discharge lamps of the high pressure sodium lamp or equivalent type, which element acts as a normal resistor in the pulse network under ordinary conditions, but which exhibits an extremely non-linear negative voltage coefficient of resistance beyond a certain applied voltage level so as to protect the network from being damaged when there is an open in the lamp terminals or other initiation of an extremely high voltage spike. The resistance element is created using thickfilm techniques by blending materials together to make a suitable protecting dielectric.

BRIEF DESCRIPTION OF THE DRAWINGS

So that the manner in which the above-recited features, advantages and objects of the invention, as well as others which will become apparent, are obtained and can be understood in detail, more particular description of the invention briefly summarized above may be had by reference to the embodiment thereof which is illustrated in the drawings, which drawings form a part of this specification. It is to be noted, however, that the appended drawings illustrate only a typical embodiment of the invention and are therefore not to be considered limiting of its scope, for the invention may admit to other equally effective embodiments.

IN THE DRAWINGS

Figure 1:
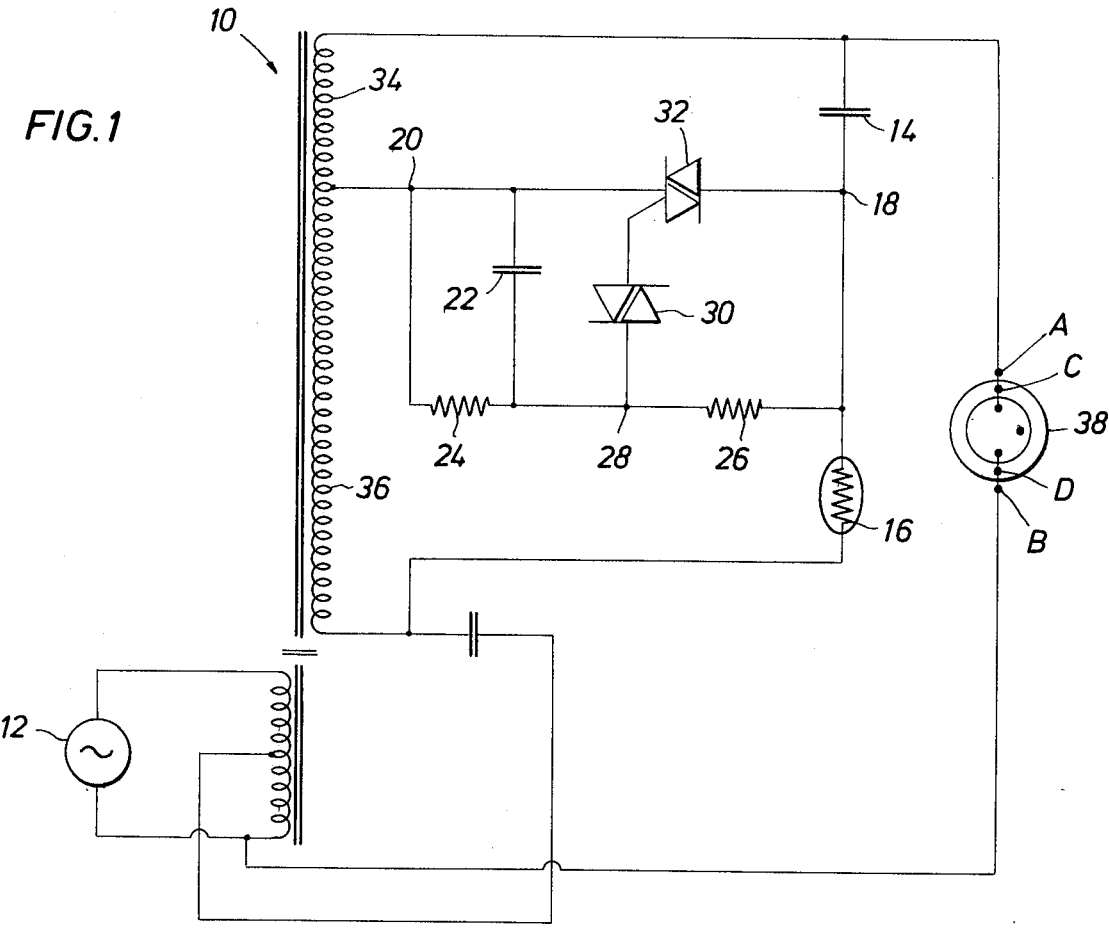

FIG. 1 is a simplified schematic diagram of a starting and protection circuit in accordance with a preferred embodiment of the present invention.

Figure 2:
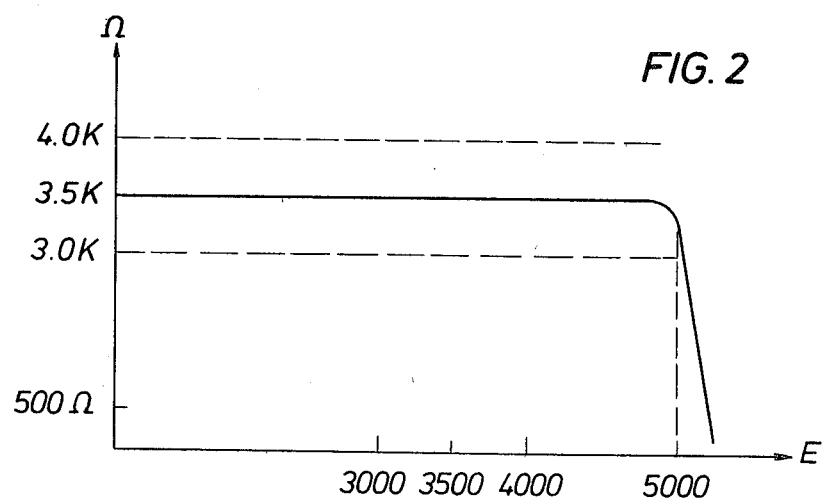

FIG. 2 is a graphical representation of the negative coefficient of resistance exhibited by the protection element of a preferred embodiment of the present invention.

DESCRIPTION OF THE PREFERRED EMBODIMENT

Now referring to the drawings, and first to FIG. 1, a simplified schematic diagram of a typical starting circuit is shown for use with a high pressure sodium or similar high intensity, gaseous discharge lamp. A ballast autotransformer 10 is connected to an AC power supply 12. The secondary of the transformer applies a transformed AC voltage waveform across the series combination of capacitor 14 and resistor 16. Capacitor 14 is typically a capacitor having a nominal value of about 0.15 microfarads and resistor 16 has a nominal value of about 3.5 kohms. The ratio of capacitive reactance of capacitor 14 to the impedance of resistor 16 results in the majority of the voltage developed across the entire series to be developed primarily across the capacitor for a 60 Hz source of power.

A voltage is also developed from junction 18 of these two components to transformer connection 20 as a result of the transformer action and the presence of the divided voltage at point 18. The voltage across points 18 and 20 is divided by the network formed by capacitor 22 connected in shunt with resistor 24 and in series with resistor 26. Hence, there is a voltage from junction 28 between resistors 24 and 26 and point 20. When the voltage from points 20 to 28 exceeds the breakover threshold voltages of diac 30 connected to point 28, diac 30 enters a negative resistance conduction mode and discharges capacitor 22 into the gate terminal of triac 32.

The main power terminals of triac 32 are in series between points 18 and 20. When triac 32 conducts, it discharges capacitor 14 through transformer winding portion 34, which is that part of the winding that is then connected in parallel with the capacitor 14.

Transformer winding 34 in conjunction with winding 36, the other portion of the secondary, are of an appropriate ratio to transform the energy stored in capacitor 14 to a surge or pulse voltage waveform having suitable characteristics to initiate conduction or ignition of HID lamp 38.

Lamp 38 is of the high pressure sodium lamp type and is connected into the circuit at terminals A and B. The welded terminals inside the vacuum envelope of the lamp are marked as terminals C and D. A failure of an operating lit lamp 38 often occurs by an open circuit appearing either at terminals A and B or at terminals C and D. The A-B failure produces an inductive voltage surge which causes a resulting collapse of energy across windings 34 and 36. Typically this will cause a voltage across windings 34 and 36 of from about 5000 to 7000 volts for a period of time from about one-half a cycle to several cycles. This compares to a normal pulsing voltage for normal starting purposes of less than 4000 volts. As a result, capacitor 14 is commonly destroyed because of overvoltage thereacross. Sometimes triac 32 is likewise destroyed. This is one type of failure that the protection device hereafter described is designed to prevent.

Failure of a weld at C or D is another source of potentially destructive voltage surges. When such a failure occurs, there is a resulting reduction of pressure in the envelope and an exceedingly rapid interruption of current. This produces a very high voltage on the order of 25,000 volts that commutates triac 32 and expectedly destroys resistor 16 and possibly even ballast 10.

Resistor 16 is subjected to high voltage pulses during normal starting, but as noted, far less than is applied in either of the A-B or C-D failure modes. It has been discovered that resistor 16 can be manufactured using a non-standard mixture of glasses in a thick-film construction technique. Thickfilm manufacture of resistive components using resistor inks is described in the *Handbook of Thick Film Hybrid Microelectronics,* McGraw-Hill, 1974, which is incorporated herein by reference for all purposes. Following such practices, the following sequence of conductive, resistive and dielectric materials from E. I. duPont de Nemours & Co. are blended and mixed for making a dielectric material having the desired characteristics hereafter discussed. The resistor is formed using the standard process parameters with #4237 resistor ink, terminated with #9922 conductor ink, and overcoated with #9949 dielectric ink. Dielectric glass composition materials differ considerably in their physical and chemical properties and composition from the normal materials used as a protective overglazing material on top of thick film resistor constructions. In fact, due to these differences, the dielectric glass material chemically and physically attacks the material of the resistor during the processing of these materials. Normally, this is avoided by not using a dielectric glass composition on top of a resistive material. In this case, however, it is this normally undesirable and avoidable attack which produces the sought for and discovered properties of this invention.

Equivalent materials from other manufacturers would also result in the same functioning product. Although it has been previously known that it would change the sheet resistivities of resistive materials to introduce mixtures therewith, it has heretofore been thought that this is undesirable for dielectric glass to influence resistance values with temperature.

But, it has been discovered by the present inventor that resistors coated with dielectric glass in accordance with the above mixture of materials have a stable linear coefficient of resistance over a voltage range up to a predetermined value. Beyond that value, the dielectric glass-coated resistor exhibits a negative and non-linear coefficient of resistance, as shown in FIG. 2 at about 5000 volts for one specific geometry used.

In operation, when the voltage goes to a high value as a result of either an A-B or a C-D failure, resistor 16 becomes much lower in resistance regardless of the rate of application of the voltage. This forces triac 32 to commutate and shunts potentially destructive voltages away from the triac, away from capacitor 14 and does not have any lasting adverse affects on resistor 16, which dissipates the resulting overvoltage energy therethrough. Hence, resistor 16 made in accordance with the manufacturing technique just described is an effective normal resistor under regular operating conditions and is an effective voltage limiting element when the voltage applied thereto even momentarily exceeds the design threshold level for its non-linear resistive coefficient range. It should be noted that even the A-B failure, which normally would destroy capacitor 14 without destroying resistor 16, causes resistor 16 to be transformed into its protection mode. Hence, resistor 16 is a universal type of protection element for either an A-B or a C-D failure. This is a surprising result since the two types of failures have manifested different destructive results prior to the present invention. In fact, the inclusion of such a component in the circuit provides a measure of protection from surges caused by lightning.

While a particular embodiment of the invention has been shown and described, it will be understood that the invention is not limited thereto, since many modifications may be made and will be apparent to those skilled in the art.

What is claimed is:

1. A high voltage starting and protection circuit for a high intensity, gaseous discharge lamp, comprising
   transformer means connected to line power for providing transformed AC voltage,
   voltage divider means including a capacitor and a resistor connected to said transformer means,
   voltage breakdown means connected to said transformer means and said voltage divider, and
   trigger means for gating on said voltage breakdown means and discharging said capacitor to provide starting pulses to the HID lamp when it is unlit,
   said resistor having a non-linear negative coefficient of resistance for surges in voltage above a predetermined threshold resulting from a sudden open operating lamp, a sudden drop of resistance value of said resistor dissipating said voltage surges and preventing destructive conduction of said voltage breakdown means at said surges of high voltage.

2. A high voltage starting and protection circuit in accordance with claim 1, wherein said resistor is comprised of dielectric glass on top of a standard thick film resistor to achieve appropriate non-linear voltage coefficient of resistance.

3. A high voltage starting and protection circuit in accordance with claim 2, wherein said non-linear negative coefficient occurs at about 5000 volts.

* * * * *